United States Patent [19]

Furusawa

[11] 4,109,171
[45] Aug. 22, 1978

[54] DEVICE FOR INDICATING THE DIRECTION OF DRIVING OF A VEHICLE

[76] Inventor: Yoshikatsu Furusawa, No. 19, Aza Uwamichi, Kemanai Towada-machi, Kazuno-shi, Akita-ken, Japan

[21] Appl. No.: 767,763

[22] Filed: Feb. 11, 1977

[30] Foreign Application Priority Data

Dec. 15, 1976 [JP] Japan .................. 51-151373

[51] Int. Cl.$^2$ .............................................. H02K 7/00
[52] U.S. Cl. .................. 310/75 C; 340/134; 315/78
[58] Field of Search ............... 340/134, 73; 310/75 C; 315/76, 72, 83; 240/7.6; 322/1

[56] References Cited

U.S. PATENT DOCUMENTS

| 2,233,039 | 2/1941 | Vianzone | 310/75.3 |
| 2,488,021 | 11/1949 | May | 310/75.3 |
| 2,883,654 | 4/1959 | Bauer, Jr. | 340/134 X |
| 3,753,000 | 8/1973 | Newman | 315/78 X |
| 3,894,281 | 7/1975 | Bloomfield | 240/7.6 X |
| 4,020,458 | 4/1977 | Windisch | 340/134 X |

FOREIGN PATENT DOCUMENTS 179,304  8/1935  Switzerland .................. 310/75.3

Primary Examiner—Donovan F. Duggan

[57] ABSTRACT

In a device for emitting signal in driving vehicle, in which a miniature power generator is employed to produce an electric power for emitting said signal in such a manner, that the rotor of said miniature generator is rotated under the utilization of the rotation of the wheel of the vehicle by manipulating the miniature generator to tilt to the position, at which the rotary head of the miniature generator will contact with at least a portion of the wheel, the improvement, wherein the rotary head of the miniature generator is contacted onto a strip of rubber-like substance fixed on the side surface of tire of the wheel made of rubber-like substance, said strip covering at least a segment of the circle of the tire and projecting aside to permit contact with said rotary head of the miniature power generator.

4 Claims, 5 Drawing Figures

DEVICE FOR INDICATING THE DIRECTION OF DRIVING OF A VEHICLE

BACKGROUND OF THE INVENTION

The present invention relates to a device for course change indication for vehicles which usually do not use batteries or electric cells such as bicycles, cultivators, and so on.

In such vehicles, a series of operations of lighting up, putting out and blinking of the course change indication lamp are assumed to be impossible, insofar as an electric cell is not provided or an electrically operated flasher device is not equipped therefor. In order to achieve such purpose, the inventor of the present invention had, therefore, previously made an invention already patented under Japanese Patent No. 796,723, in which electric power is generated by a miniature generator for bicycles and is changed over by an electric circuit. In this previously patented invention, electric power is produced intermittently in such a way, that a half-ring of hard material such as metal is fixed to the spoke of the wheel of a bicycle and by contacting the rotary head of the miniature power generator with said half-ring, electric power is generated intermittently during the half period in each revolution of a wheel and the so-produced electric power is then changed over to the circuit corresponding to the side to be turned to. This previous invention reveals, however, difficulties in that, the efficiency of power generation may decrease or an obstacle in the power generation may be introduced by, for instance, frosting or so on. Accordingly, it is intended by the present invention, to improve the former method in such a manner that, by causing the rotary head of the miniature generator to contact with the rubber tire of the wheel of a bicycle, the above-mentioned defect can be eliminated and at the same time, under the utilization of the elasticity of rubber and basing upon the greater circumferential velocity due to the larger diameter for the rubber tire rotating at a more outer position than the spoke as in the former invention, a greater amount of power generation can be attained.

SUMMARY OF THE INVENTION

The essential feature of the present invention resides in that, in turing on and shutting off the course change indicator lamps of a vehicle according to traffic rules and regulations by electrifying the indicator lamp circuit of either the left or the right side by generating an electric power intermittently, the efficiency of the power generation and also the rotating velocity of the power generator is increased so as to markedly magnify the power generation function of the generator and thereby to assure indication of the driving course change by providing the tire of the vehicle's wheel, which, in general, consists of rubber-like material, with an arcuate strip 2 having a contour corresponding to a segment of the tire circle, in such a manner, that it projects sideways, in order to permit frost adhering on the arcuate strip 2 in winter as well as mud and soil in all seasons to come off due to the deformation of the tire during travelling of the vehicle by the contact with the ground surface etc. and to thereby assure a firmer contact of the strip with the rotary head of the miniature power generator.

Moreover, according to the present invention, by installing two equal strips 2 on both side-surfaces of the tire in a symmetrical manner, it is possible to maintain a balance of rotation of the tire and at the same time increase the durability or longevity of the tire by exchanging the side of the contact of strip with the rotary head of the miniature generator upon wearing out of the contacting surface of the strip on one side of the tire.

Furthermore, with respect not only to the longevity, but also to the installation costs for, such as, the electric accessories incidental thereto, the device according to the present invention is far more superior than those in which an electric cell, etc. is employed and in addition it is further advantageous in that it permits a simple and favourable manipulation near the handlebars, so that it will find wide use in vehicles such as bicycles, cultivators and so on.

Other and further objects, features and advantages of the invention will be described in the following description.

BRIEF DESCRIPTION OF THE DRAWINGS

Attached drawings show the embodiment of the present invention.

DETAILED DESCRIPTION OF THE EMBODIMENTS

The invention will now be explained in detail by reference to a preferred embodiment.

Figure 1:
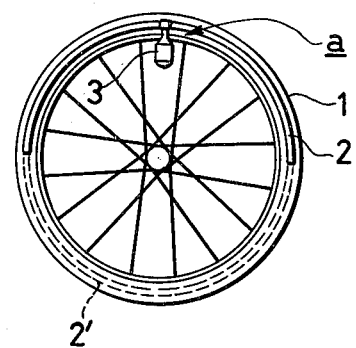
FIG. 1 is a schematic front view of the generating part.
Figure 2:
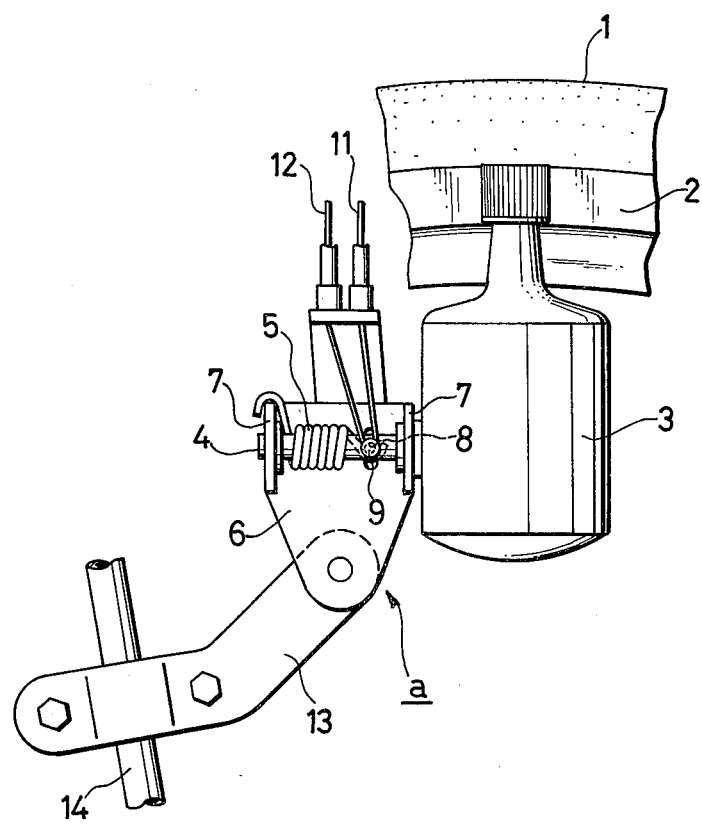
FIG. 2 is an enlarged front view of the generating major part.
Figure 3:
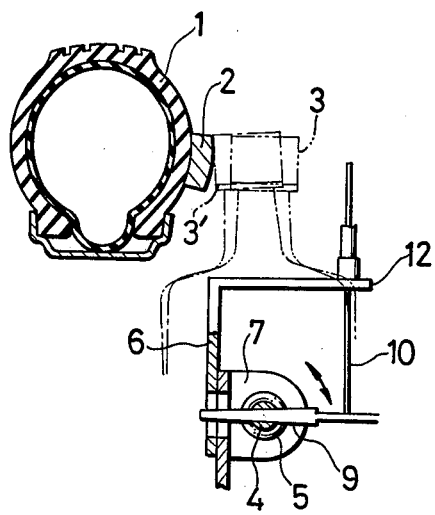
FIG. 3 is a section of the generating major part for illustrating its operations.

The essential constitution of the device according to the present invention consists of a power generation part (a) and a course change indication manipulation part (b). The essential construction of the power generation part (a) is such that a strip in a shape of a half-ring 2 made of rubber-like material is fixed on one side surface of the tire 1, so that it covers half of the circumference of the tire, and the miniature power generator 3 is so arranged, that it is optionally capable of contacting said half-ring strip or move away therefrom, and in addition, in order to take measures for maintaining balance of the rotation of the wheel and for making provision as a reserve against the wearing out of the contact portion, another strip 2' which is equal to strip 2, in size, shape and material is reached to the other side surface of the tire at the position symmetrical with strip 2 with respect to the wheel axle. Explaining the power generation part (b) detailedly, an axle 4 constructed bodily with the miniature power generator 3 and to be used for installation thereof, is equipped with a spring 5 and is pivotably held at its both ends by bearings 7 which are bodily disposed on both sides of a mounting base 6 of the power generator. In a hole 8 disposed in a portion of the installation axle 4, there is inserted a pin 9. As can be seen in FIG. 3, one terminal of the spring 5 is fixed at the left-hand end of the pin 9. At the right-hand end of pin 9, two transmission wires 10, 11 are fixed for steering the power generator 3 for contact with the side surface of the tire 1. The socket 12 for receiving the transmission wire is integrally constructed with the base 6 and supports the operation of the wires 10 and 11 which are fixed at an adequate position of the front or rear fork frame 14 of the bicycle through an arm 13 adjustable for mounting the miniature power generator. As a means of reference, one terminal of the spring 5, the other terminal of which is fixed to the pin 9, is fixted to the bearing 7.

Figure 5:
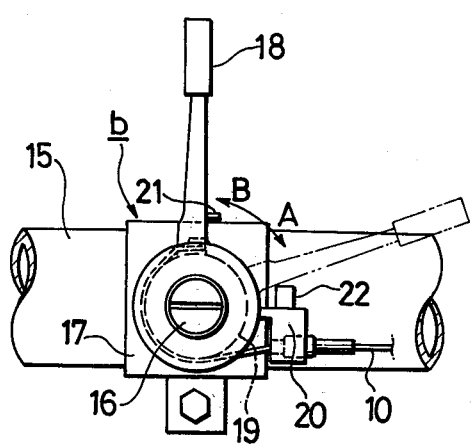
FIG. 5 is a front view of the manipulation part of the device.

In FIG. 5, the manipulation part of the device for course change indication is shown in a front view in which, on the upper pipe frame 15 between the saddle and handlebar of a bicycle, a band 17 having a short spindle 16 projecting laterally therefrom is fixed and to this short spindle 16, a ring 19, to which the wire 10 or 11 is bound and which is provided with a manipulation lever 18 bodily formed therewith, is so tightened, that it is permit to turnaround by surmounting the counter force of the spring 5 upon manipulation. The transmission wire 10, one terminal of which is fixed to the pin 9, leads through a wire supporting member 20, arranged on the upper pipe frame 15, to the ring 19, to which the other terminal thereof is fixed. An electric junction terminal 21 is provided at the lower end of the manipulation lever 18 and constitutes, together with the contact 22 fixed on the supporting member 20, a structure of an electric junction for the electric circuit. On the band 17, one couple of the manipulation part (b) is assembled each to each side of the frame 15. In other words, each set consisting of a short spindle 16, a manipulation lever 18, a ring 19, a transmission wire 11, a supporting member 20, contact 22 and connecting terminal 21 is assembled on the upper frame 15 at a position suitable for the manipulation respectively for right and left sections of the manipulation part by means of the band 17.

Figure 4:
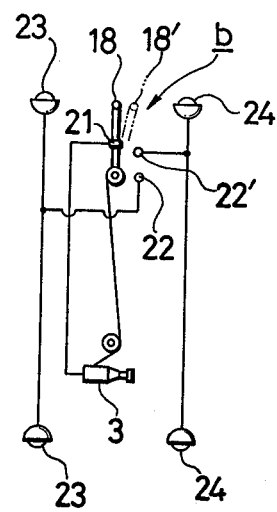
FIG. 4 is a electric circuits of the manipulation part for direction indication.

As shown in FIG. 4, the electric circuit conducted from the miniature power generator 3 is connected to each connecting terminal 21 of the manipulation levers 18 and 18' on both sides and the electric circuits conducted from the left side front and rear indicator lamps of the bicycle for left turn indication and from the right side front and rear indicator lamps for right turn indication are connected to each contact 22, which construction constitutes the prefered embodiment of the present invention.

As to the function of the device according to the present invention as exemplarily disclosed above, the following explanation may be illustrative. For emitting left turn signals, the manipulation lever 18 on the left side of the upper pipe frame 15 is turned down in the direction A indicated in FIG. 5, whereby the wire 10 is drawn upwards by the rotation of the ring 19 so as to also move the pin 9 in the same direction thereby tilting the miniature power generator 3 around the axle 4 into the position indicated in FIG. 3 to contact with the strip 2. At this moment, the connecting terminal 21 on the manipulation lever 18 also comes in contact with the contact 22 thereby closing the circuit leading from the miniature power generator 3 to the front and rear signal lamps 23 for left turn indication so as to cuase the lamps 23 to blink on and off. In order to stop the blinking of the lamps, the manipulation lever 18 is turned back from the position A to the position B so as to release the transmission wire 10, whereby the pin 9 is moved by the resiliency of the spring 5 towards the position B to cause the miniature power generator 3 to come away from the position 3' thereby opening the electric circuit and cease power generation.

In order to cause the blinking or shutting off of the signal lamps 24 before and during right turn indication, the same operation as mentioned above is carried out with the right side manipulation lever 18.

What we claim is:

1. In a device for emitting a signal in a driven vehicle such as a bicycle, said device including a miniature power generator employed for producing electric power and for emitting said signal in such a manner that the rotor of said miniature generator is driven by the rotation of the wheel of the vehicle by tilting the miniature generator to a position at which said rotary head of said miniature generator contacts at least a portion of said wheel, the improvement wherein said rotary head of said miniature generator contacts a strip of rubber-like substance fixed to the side surface of a wheel tire made of a rubber-like substance, said strip covering only a segment of the circumference of said tire and projecting sideways to permit contact with said rotary head of said miniature power generator.

2. A device according to claim 1, wherein said rubber-like strip is fixed on each side surface of the tire symmetrically to each other with respect to the axis of said wheel.

3. A device for indicating a change of a driving course of vehicles, comprises a strip of a rubber-like substance having a form of a segment of the circle of a tire of a wheel is fixed onto said tire made of rubber-like substance in such a manner, that a rotor head of a miniature power generator can come in contact with said fixed strip intermittently upon rotation of the wheel, holding said miniature power generator in such a manner that it optionally permits itself to contact with and come away from said strip, connecting said miniature generator to a manipulation lever mounted rotatably on a frame of the vehicle by a means of transmission wire, constructing an electric junction member, by binding an electric circuit conducted from said miniature generator, onto said manipulation lever, disposihng contacts on each of the electric circuits connecting the front and rear indicator lamps for right side and left side of the vehicle upon the orbit of rotation of said junction member of the manipulation lever in opposition therewith and blinking of said front and rear indicator lamps on the left or right side of the vehicle by operation of said wire.

4. A device according to claim 3, wherein said strips made of a rubber-like substance are symmetrically fixed to both side surfaces of the tire with respect to the wheel axis, in order to maintain a balance of wheel rotation.

* * * * *